(12) United States Patent
Ozserin (10) Patent No.: US 12,001,627 B2
(45) Date of Patent: Jun. 4, 2024

(54) SIMULATED INPUT MECHANISMS FOR SMALL FORM FACTOR DEVICES (71) Applicant: ZEBRA TECHNOLOGIES CORPORATION, Lincolnshire, IL (US)

(72) Inventor: Ozgur Ozserin, London (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/325,832

(22) Filed: May 20, 2021

(65) Prior Publication Data
US 2022/0374096 A1 Nov. 24, 2022

(51) Int. Cl.
G06F 3/041 (2006.01)
G06F 3/04886 (2022.01)
G06F 3/04892 (2022.01)

(52) U.S. Cl.
CPC .......... *G06F 3/0414* (2013.01); *G06F 3/0416* (2013.01); *G06F 3/04886* (2013.01); *G06F 3/04892* (2013.01)

(58) Field of Classification Search
CPC .. G06F 3/0414; G06F 3/0416; G06F 3/04886; G06F 3/04892
See application file for complete search history.

(56) References Cited

U.S. PATENT DOCUMENTS

| 2013/0227460 A1* | 8/2013 | Jawerth | G06F 3/04886 715/773 |
| 2014/0160078 A1* | 6/2014 | Seo | H04W 12/08 345/175 |
| 2015/0205365 A1* | 7/2015 | Kakegawa | H04N 23/661 345/173 |
| 2016/0098137 A1* | 4/2016 | Kim | G06F 3/04883 345/173 |
| 2016/0283724 A1* | 9/2016 | Hird | G06F 3/0482 |
| 2017/0277430 A1* | 9/2017 | Ukai | G06F 3/04883 |
| 2018/0059809 A1* | 3/2018 | McClendon | G06F 3/0482 |

* cited by examiner

Primary Examiner — Ryan A Lubit (57) ABSTRACT

A wearable computing device includes a display, a motion sensor, and a controller that: defines a pose of a simulated input object with selectable input elements; using the motion sensor, determines current poses of the display, and for each pose: (i) based on the pose and the pose of the input object, selects a portion of the input object, including a subset of the input elements, and (ii) renders the portion of the input object on the display; for at least one of the current poses, detects a simulated key press associated with one of the subset of input elements, and generates input data corresponding to the one of the subset of input elements. The device includes a housing containing the display, the motion sensor, and the controller; and a mounting component, coupled to the housing and configured to removably affix the housing to a forearm of an operator.

16 Claims, 8 Drawing Sheets

SIMULATED INPUT MECHANISMS FOR SMALL FORM FACTOR DEVICES

BACKGROUND

Certain computing devices, such as smart watches, have displays with smaller areas than other devices (e.g. smart phones, laptop computers, and the like). The displays of devices such as smart watches may therefore be poorly suited to presenting keyboards or other input interfaces with which an operator of the device can interact, e.g. via touch. Other input mechanisms, such as scripting or voice input, may be less accurate than touch-based keypad input, and/or may be unsuitable for use in certain operating environments.

SUMMARY

In an embodiment, the present invention is a wearable computing device, comprising: a display; a motion sensor; a controller configured to: define, in a local coordinate system, a pose of a simulated input object having a plurality of selectable input elements; using the motion sensor, determine a sequence of current poses of the display in the local coordinate system, and for each current pose in the sequence: (i) based on the current pose and the pose of the simulated input object, select a portion of the simulated input object, including a subset of the selectable input elements, and (ii) render the portion of the simulated input object on the display; for at least one of the sequence of current poses, detect a simulated key press associated with one of the subset of selectable input elements, and generate input data corresponding to the one of the subset of selectable input elements; a housing containing the display, the motion sensor, and the controller; and a mounting component, coupled to the housing and configured to removably affix the housing to a forearm of an operator.

In another embodiment, the present invention is a method in a wearable computing device, the method comprising: defining, in a local coordinate system, a pose of a simulated input object having a plurality of selectable input elements; using a motion sensor of the wearable computing device, determining a sequence of current poses of a display of the wearable computing device in the local coordinate system; for each current pose in the sequence: (i) based on the current pose and the pose of the simulated input object, selecting a portion of the simulated input object, including a subset of the selectable input elements, and (ii) rendering the portion of the simulated input object on the display; for at least one of the sequence of current poses, detecting a simulated key press associated with one of the subset of selectable input elements; and generating input data corresponding to the one of the subset of selectable input elements.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1:
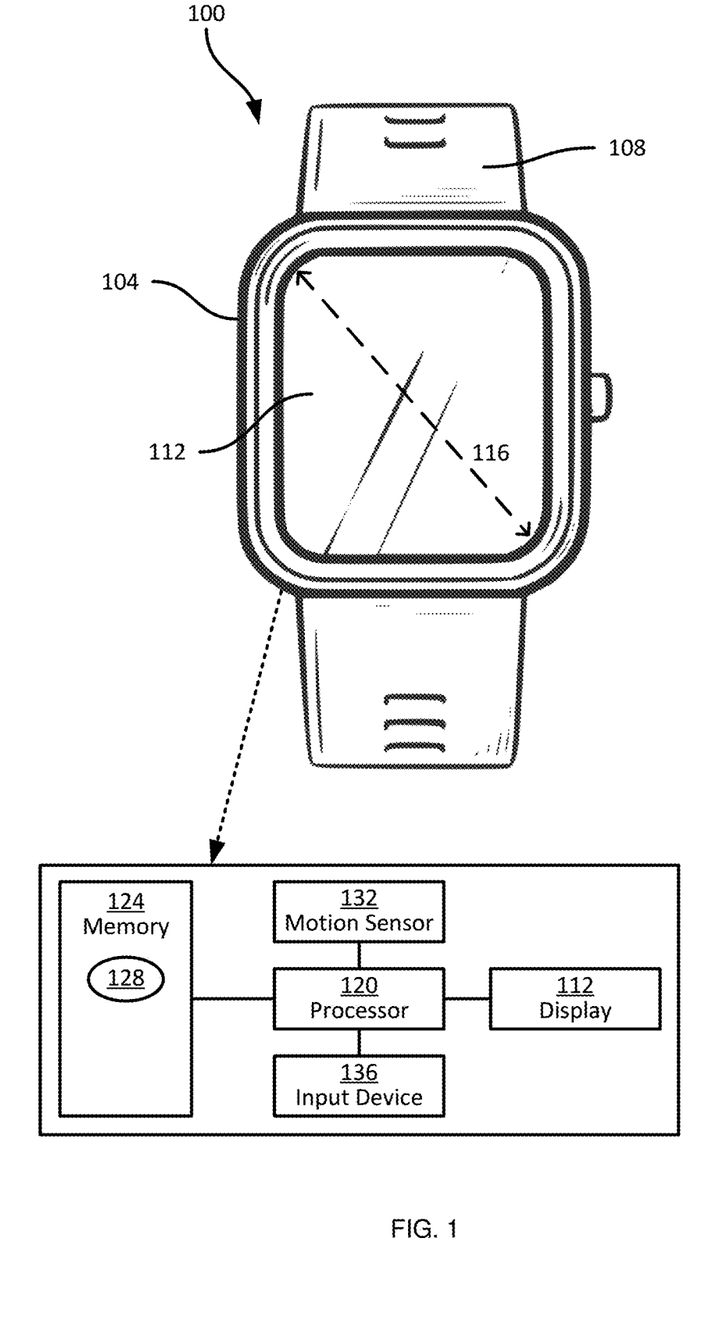
FIG. 1 is a diagram of a wearable computing device.

FIG. 1 illustrates a mobile computing device 100 with a small form factor display. In the illustrated example, the device 100 is a smart watch. More generally, however, the device 100 is a wearable device, configured to be worn on a forearm (e.g. an arm, wrist, finger, or the like) of an operator, as opposed to a head or other limb of the user. The device 100 can therefore also be a forearm-mounted mobile computer, a device with a ring form factor worn on a finger (or plurality of fingers) of the operator, or the like.

The device 100 includes a housing 104 containing or otherwise supporting various other components of the device 100, described in greater detail below. The device 100 also includes a mounting component 108, such as a band (e.g. a wristband) configured to removably affix the housing 104 to a forearm of an operator.

The components contained or supported within or by the housing 104 include a display 112, which is supported by the housing so as to be connected to internal components of the device 100, as well as accessible from the exterior of the device 100. The display 112 has a smaller form factor than various other forms of mobile computing devices, such as tablet computers and laptop computers. For example, while a smart phone may have a display with a diagonal dimension of about five inches or greater, the display 112 has a diagonal dimension 116 of about two inches or less. In some examples, such as those in which the device 100 is implemented as a ring worn on one or more fingers of an operator, the diagonal 116 may be smaller than about one inch. The display 112 may therefore be poorly suited to displaying a keypad or keyboard for receiving operator input. In particular, rendering a keyboard (e.g. including sixty or more keys) on the display 112 results in each key being significantly smaller than the fingertip of the operator, with the result that visibility of the keys may be reduced, and increasing the likelihood of mistakenly selected keys.

The device 100 therefore implements functionality to enable keypad-based input on small displays such as the display 112, by presenting a subset of keys or other selectable elements on the display 112 rather than an entire keypad, keyboard or the like. For example, the subset of keys may be presented on the display 112 without presenting the remaining keys, thus allowing those presented to be rendered with a size that facilitates visibility and selection. The device 100 further implements functionality to update which subset of keys is visible over time, enabling access to a full keypad, keyboard, or the like, without showing the full keypad at one time.

To that end, certain internal components of the device 100 are also shown in FIG. 1. In addition to supporting the display 112, the housing 104 also contains a processor 120 (e.g. a central processing unit, CPU), which may also be referred to as a controller. The processor 120 is interconnected with a non-transitory computer readable storage medium, such as a memory 124. The memory 124 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 124 each comprise one or more integrated circuits. In some examples, the processor 120 and the memory 124 can be implemented as a system on a chip (SoC).

The memory 124 stores computer readable instructions for execution by the processor 120. In particular, the memory 124 stores an input application 128 (also referred to simply as the application 128) which, when executed by the processor 120, configures the processor 120 to perform various functions discussed below in greater detail and related to the above-mentioned enablement of keypad-based input on the device 100. The application 128 may also be implemented as a suite of distinct applications in other examples. Those skilled in the art will appreciate that the functionality implemented by the processor 120 via the execution of the application 128 may also be implemented by one or more specially designed hardware and firmware components, such as field-programmable gate arrays (FPGAs), application-specific integrated circuits (ASICs) and the like in other embodiments.

The device 100 further includes a motion sensor 132, such as an inertial measurement unit (IMU) including one or more accelerometers and/or one or more gyroscopes. The motion sensor 132 is configured provide sensor data to the processor 120, from which the processor 120 can detect movement of the housing 104. More specifically, from the sensor data generated by the motion sensor 132, the processor 120 can track a pose of the device 100, including a location of the device 100 in three dimensions, and an orientation of the device 100 in three dimensions.

The device 100 can further include an input device 136 configured to receive input from an operator of the device 100. The input device 136 can include a touch screen integrated with the display 112, for example. In other examples, the input device 136 can include, in addition to or instead of the touch screen, one or more physical buttons, e.g. disposed on a perimeter of the housing 104.

As will be described below, the device 100 is configured to simulate an input object, such as a keypad, keyboard, or the like. Based on the current pose of the device 100 as measured via the motion sensor 132, the device 100 is configured to render only a portion of the input object on the display 112, increasing visibility and selectability of that portion. The device 100 is further configured to detect selections associated with the simulated input object via the input device 136, and to generate input data in response to such selections (e.g. for use by another application in the memory 124, or the like).

Figure 2:
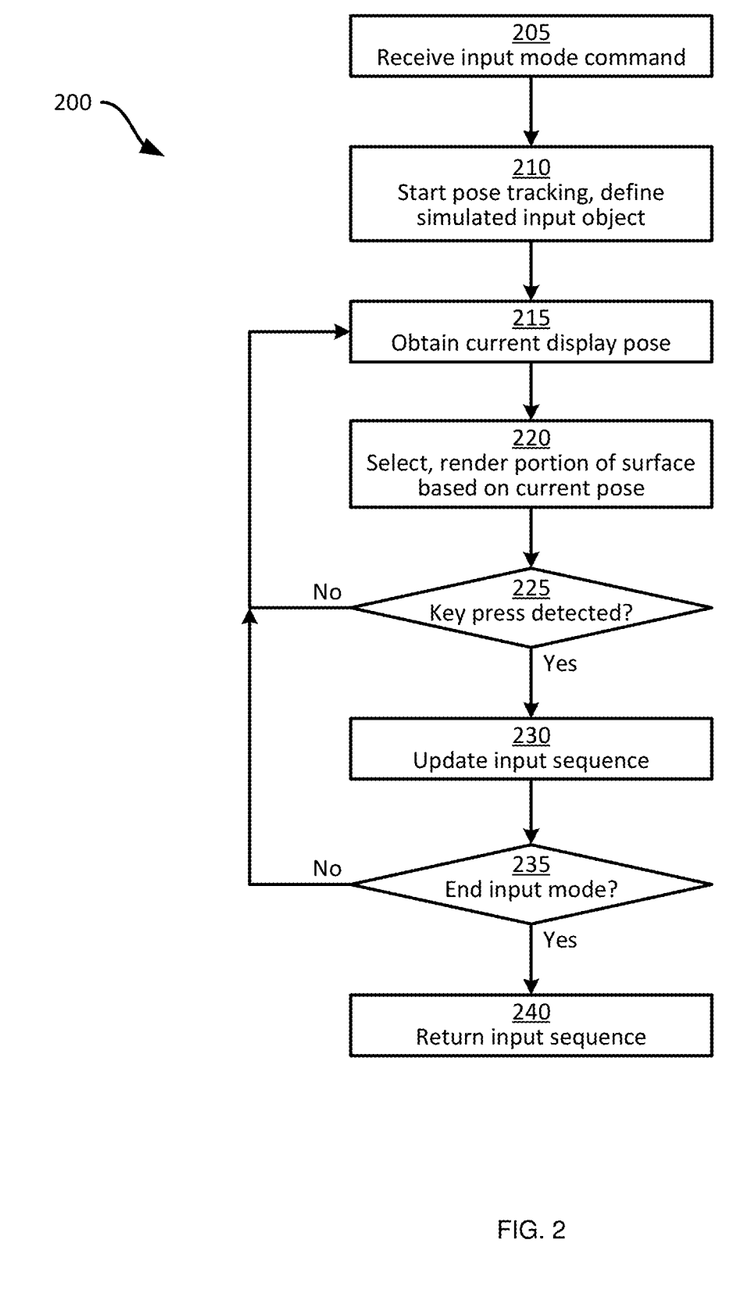
FIG. 2 is a flowchart of an input method.

Turning to FIG. 2, a method 200 for providing an input mechanism is shown. The method 200 will be described below in conjunction with its performance by the device 100. In particular, the blocks of the method 200 are performed by the processor 120, via execution of the application 128. As will be apparent from the discussion below, the processor 120 also exerts control over remaining components of the device 100 as discussed above to perform the method 200.

At block 205, the processor 120 is configured to receive an input mode command. The input mode command is an instruction to enter an input mode, in which the device 100 enables the operator to provide input data to the processor 120. The input data can be used for a variety of purposes. For example, the input data can simply be stored in the memory 124, or can be used by an application other than the application 128. For example, the processor 120 can also execute a calendar application, which implements functionality enabling the operator to create and store a calendar event. Execution of the calendar application can cause the processor 120 to present an event creation interface on the display 112, including a field into which the operator can enter a title for the event. Selection of that field can constitute an input mode command. For example, in response to detecting a selection of the field on the display 112 (e.g. via the touch screen), the calendar application can activate an input mode (i.e. generate an input mode command). The processor 120 can execute the application 128 simultaneously with the calendar application, in order to detect and act on the input mode command. As will be apparent, a wide variety of other scenarios can also lead to the generation of an input mode command.

At block 210, in response to the input mode command, the processor 120 is configured to initiate pose tracking of the device 100, and to define a pose of a simulated input object with a plurality of selectable input elements.

To initiate pose tracking of the device 100, the processor 120 is configured to generate a local coordinate system. The local coordinate system is referred to as "local" because it need not have any relation to a global coordinate system or facility-wide coordinate system. The location and orientation of the local coordinate system relative to the exterior of the device 100, in other words, need not be considered. In the present example, the local coordinate system is initialized at block 210 such that the origin of the local coordinate system is at a center of the display 112, and such that a plane of the local coordinate system is parallel to the display 112.

Figure 3:
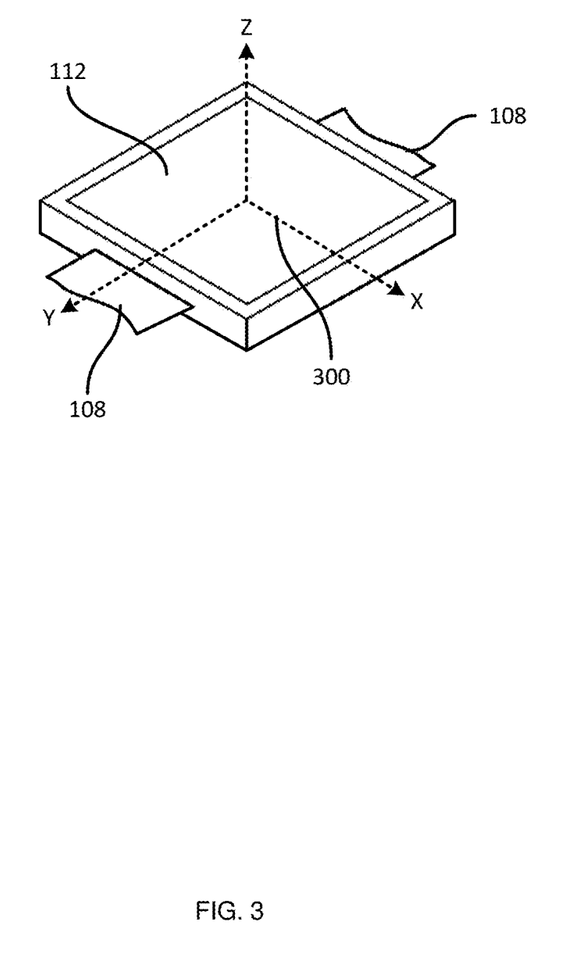
FIG. 3 is a diagram illustrating a pose of a display of the device of FIG. 1, in relation to a local coordinate system.

Turning to FIG. 3, an example local coordinate system 300 is shown, with an origin at the center of the outer surface of the display 112, and an XY plane that is parallel with the outer surface of the display 112. As a result, a third axis (the Z axis, in this example) is perpendicular to the surface of the display 112. In the illustrated example, the XY plane of the system 300 is coplanar with the outer surface of the display 112. Along with initializing the local coordinate system 300, the processor 120 obtains an initial pose of the display 112 in the local coordinate system 300. The pose of the display 112, in particular, can be defined as the location of the center of the display 112, and the orientation of the outer surface of the display 112. That is, a pose of the display 112 is defined by six values (X, Y, and Z coordinates, as well as yaw, pitch, and roll angles in the XY, YZ, and XZ planes respectively). As will now be apparent, when the local coordinate system 300 is initialized as shown in FIG. 3, the pose of the display 112 can be defined by the coordinates (0, 0, 0) and orientation angles (0, 0, 0). In other examples, however, the local coordinate system 300 can be initialized with various other poses (i.e. locations and orientations) relative to the display 112. The display 112 therefore, in those examples, can have an initial pose that differs from that mentioned above. In general, determining the pose of the display 112 once the local coordinate system 300 has been established includes obtaining sensor data from the motion sensor 132, and determining the display pose from the sensor data and stored calibration data defining the position of the display 112 relative to the motion sensor 132.

As noted above, the processor 120 is also configured to define a pose of the simulated input object at block 310. The memory 124 contains a definition of the simulated input object, e.g. as a portion of the instructions defining the application 128. The simulated input object includes, for example, a virtual keypad, keyboard, control panel, or the like, and includes a plurality of selectable input elements each occupying distinct spatial portions of the input object. The selectable elements are, in other words, virtual keys, buttons, or the like. The simulated input object definition stored in the memory 124 can therefore define the shape and/or dimensions of a perimeter of the input object, as well as the shape and/or dimensions of each selectable element, and the positions of the selectable input elements relative to a coordinate system specific to the input object (i.e. independent of the local coordinate system 300).

Figure 4:
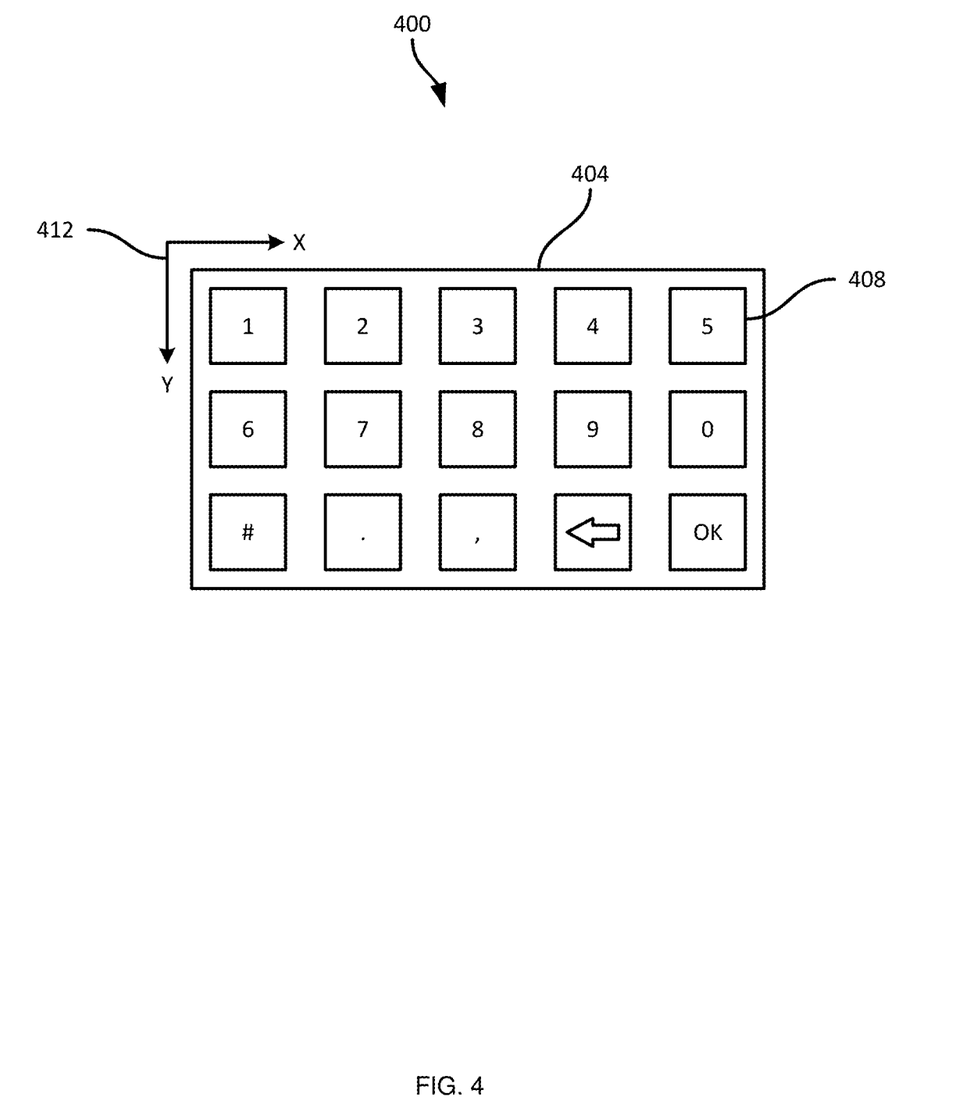
FIG. 4 is a diagram illustrating a simulated input object definition.

Turning to FIG. 4, a simulated input object definition 400 is illustrated. As will be apparent, the simulated input object definition 400 need not be stored graphically in the memory 124. The simulated input object definition 400 can also be stored as a set of coordinates and other attributes that permit reproduction of the graphical definition shown in FIG. 4.

The definition 400 includes a perimeter or base 404, enclosing a plurality of simulated keys 408 (i.e. selectable input elements). Each key 408 includes an indicium indicating the input data generated via selection of the key 408. The keys 408 in this example include numerical values, as well as punctuation marks, a backspace key (the indicium for which is a left-facing arrow) and an enter or accept key ("OK"). A wide variety of other indicia are also contemplated. Other simulated input objects can include greater or smaller numbers of keys 408, in grid layouts as shown in FIG. 4 or in any other suitable layout. The dimensions of the base 404, as well as the positions and dimensions of the keys 408, can be defined within a coordinate system 412 specific to the definition 400. Although the definition 400 as illustrated is two-dimensional, with the base 404 and keys 408 all arranged on a single plane, in other examples the definition 400 can define a three-dimensional simulated input object, and the coordinate system 412 can therefore include a third axis.

Figure 5:
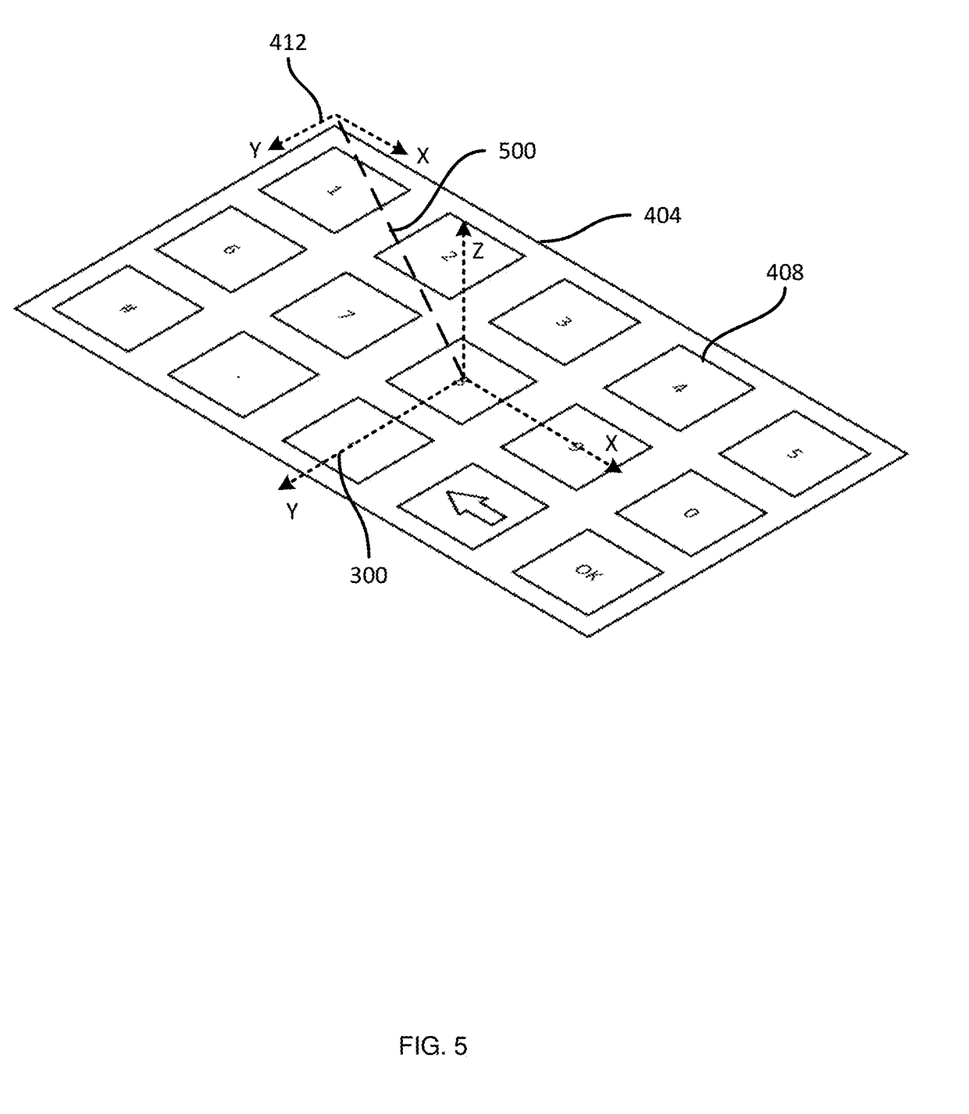
FIG. 5 is a diagram illustrating a pose of the simulated input object definition, as determined at block 210 of the method of FIG. 2.

Defining a pose of the simulated input object includes determining a transformation between the local coordinate system 300 and the coordinate system 412 of the definition 400 itself. In some examples, the device 100 can store a predetermined indication of a portion of the definition 400 to appear centered on the display 112 upon initialization of the input mode. For example, the predetermined indication can set the "8" key of the definition to be centered. As a result, as shown in FIG. 5, the processor 120 determines a translation 500 between the coordinate systems 300 and 412 that results in the "8" key being placed at the origin of the coordinate system 300. The transformation 500, when applied to the remainder of the definition 400, also defines the poses of the remainder of the simulated input object.

Returning to FIG. 2, beginning at block 215 the processor 120 is configured to render a portion of the simulated input object on the display 112, based on a tracked pose of the display 112 which can be updated at any suitable frequency, e.g. based on the rate at which the motion sensor 132 generates data. For example, the pose of the display 112 can be updated at least once per second, although more and less frequent updates are also contemplated. Thus, throughout the performance of the portion of the method 200 beginning at block 215, which can be repeated numerous times, a sequence of successive poses of the display 112 is obtained by the processor 120.

At block 220, the processor 120 is configured to select a portion of the simulated input object based on the current pose of the display 112 (i.e. the most recent pose in the sequence mentioned above), and the previously defined pose of the simulated input object. In other words, while the simulated input object is placed at a fixed pose in the coordinate system 300, the display 112 can be moved, e.g. as a result of the operator of the device 100 moving their arm, hand, or the like. The position of the display 112 relative to the simulated input object therefore changes over time.

Figure 6:
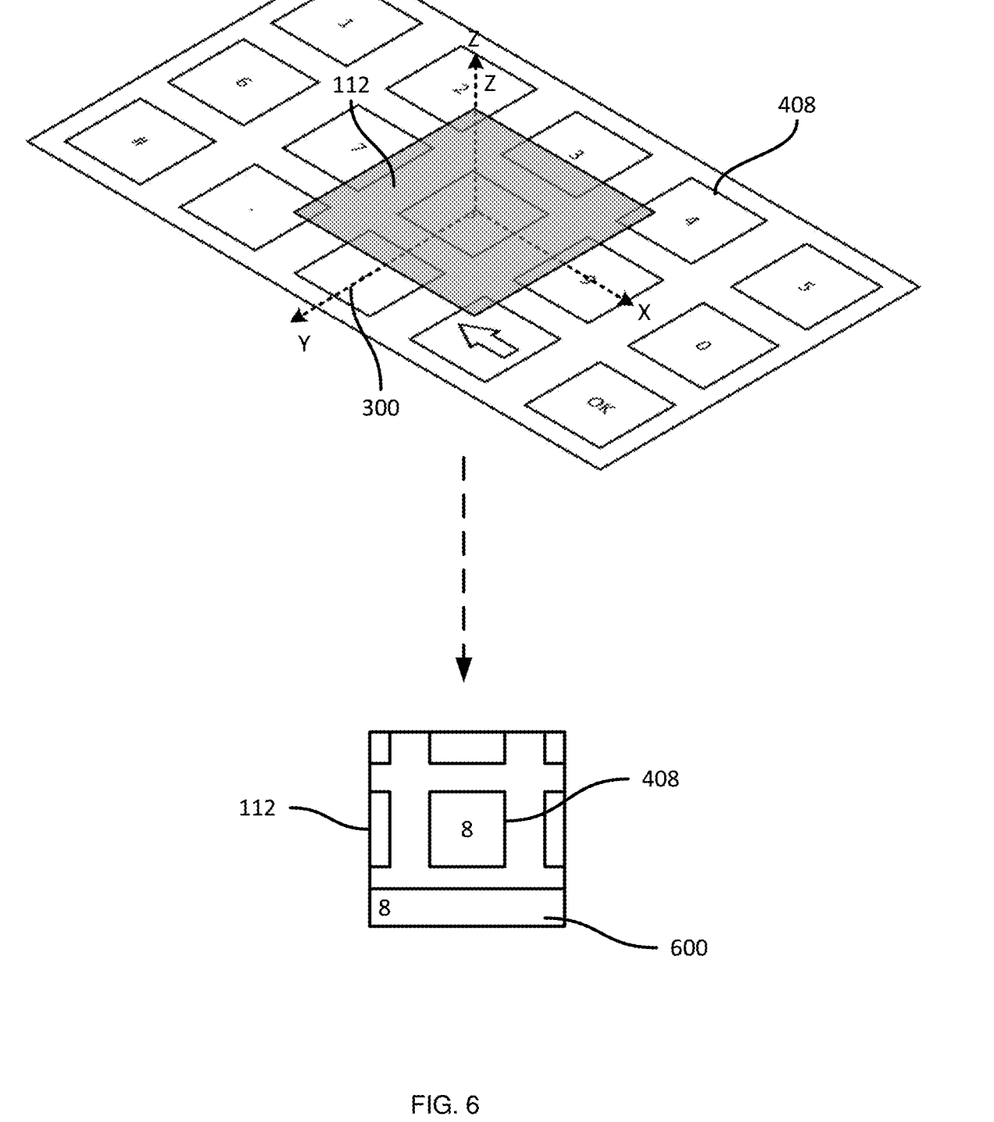
FIG. 6 is a diagram illustrating an example performance of blocks 215 and 220 of the method of FIG. 2.

To select a portion of the simulated input object, the processor 120 determines a current boundary of the display 112 in the coordinate system 300, using the tracked pose of the display and predetermined dimensions of the display 112. The boundary of the display is then overlaid on the simulated input object in the coordinate system 300. Turning to FIG. 6, the display 112 is shown in isolation, at the initial position mentioned in connection with FIG. 3. As shown in FIG. 6, the display 112 is smaller than the entire simulated input object, such that only a subset of the selectable input elements 408 fall within the boundary of the display 112. The portion of the simulated input object falling within the boundary of the display 112 is the portion selected at block 220. The selected portion is then rendered on the display, as shown in the lower portion of FIG. 6, in which the "8" key is fully visible, and only portions of adjacent keys are visible.

At block 225, the processor 120 is configured to determine whether a key press (i.e. a selection of one of the selectable input elements presented on the display 112) has been detected. The selection at block 225 can be detected, for example, using the touch screen mentioned above. For instance, if a tap is detected on the display 112/touch screen over the area containing the "8" key, a selection of that key 408 is detected. In other examples, the motion sensor 132 can be employed by the processor 120 to detect key presses. For example, motion of the device 100 substantially perpendicular to the plane of the display 112 (i.e. in the Z axis of the coordinate system 300 as illustrated) can be interpreted as a key press. For example, a downward motion of the device, followed by a substantially equal upward motion, can be interpreted as a key press. Such an implementation facilitates single-handed selection of keys, whereby the operator of the device can, with the same forearm and/or hand that the device is mounted to, both control the visible portion of the input object and select keys from the input object. Various other gestures can also be used as key presses, as will be apparent to those skilled in the art.

When the determination at block 225 is negative, the processor 120 returns to block 215, and continues updating the pose of the display 112 and the corresponding portion of the simulated input object that is visible on the display 112 via blocks 215 and 220. When the determination at block 225 is affirmative, the processor 120 is configured to advance to block 230.

At block 230, the processor 120 is configured to generate input data corresponding to the selected key from block 225.

In the example shown in FIG. 6, for example, if a selection of the "8" key is detected, the input data includes the character "8". The processor 120 can maintain an input sequence in connection with the input mode, in which successive key presses can be accumulated into a string. Thus, the input data corresponding to the selected key detected at block 225 is appended to the string, if one exists, or is placed at the beginning of a string, if no previous inputs have been detected. In some examples, the input sequence can also be presented on the display, e.g. in a predetermined region of the display. FIG. 6 illustrates such a region 600, in which the input string "8" is presented following a selection of the "8" key.

Figure 7:
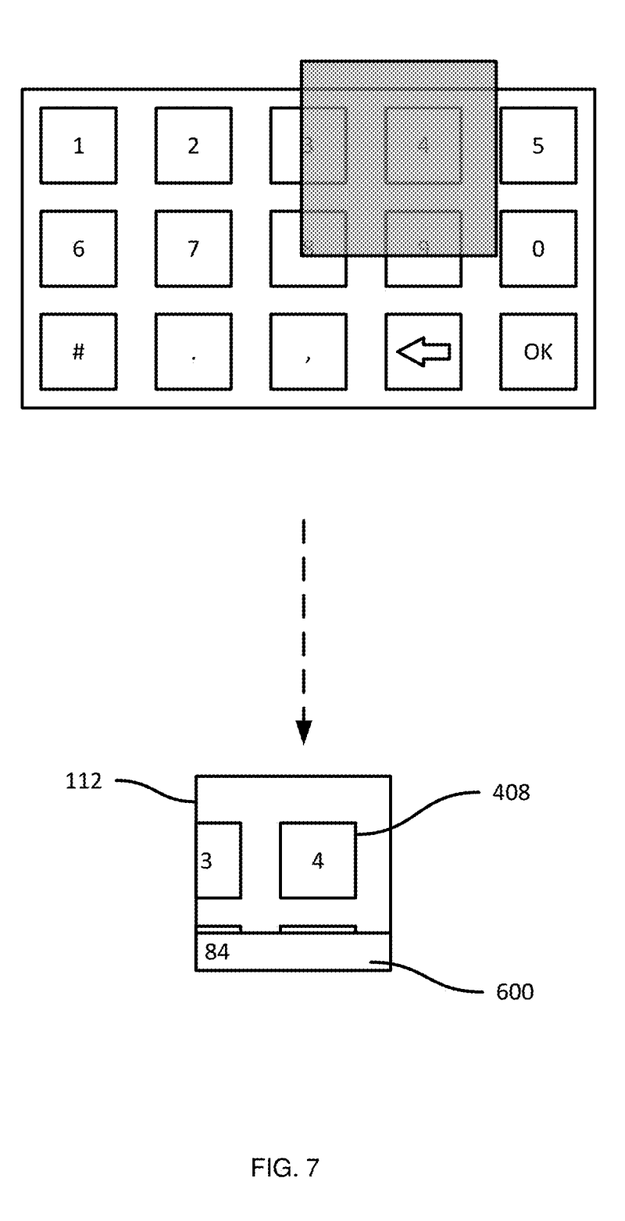
FIG. 7 is a diagram illustrating another example performance of blocks 215 and 220 of the method of FIG. 2.
Figure 8:
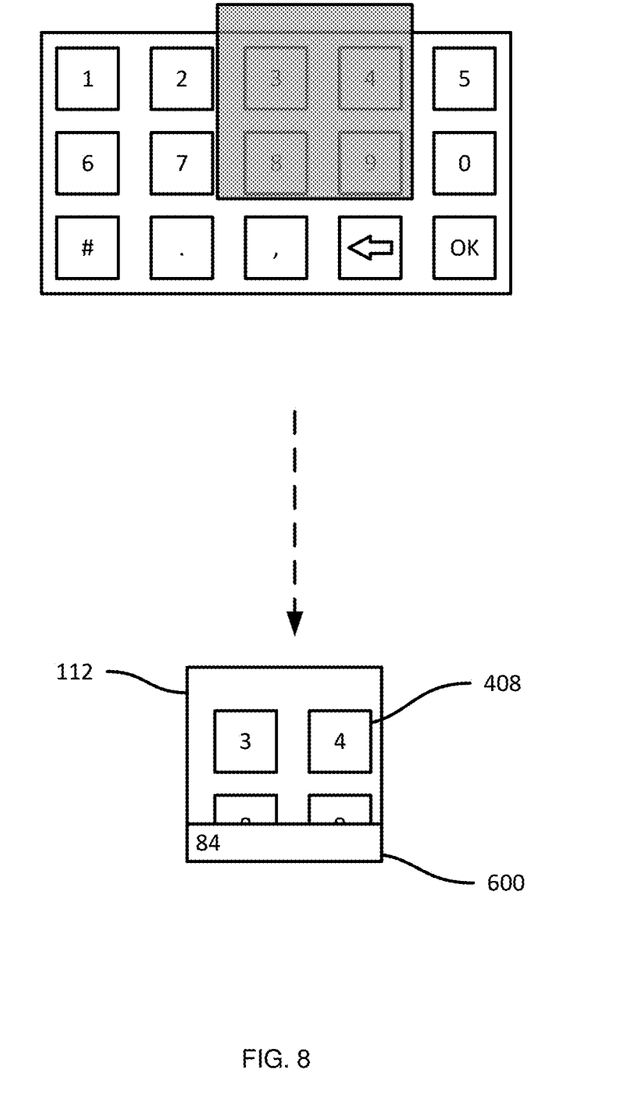
FIG. 8 is a diagram illustrating scaling of the simulated input object.

At block 235, the processor 120 is configured to determine whether the input mode is terminated. Termination can result, for example, from a detection of a particular selectable element, such as the "OK" key mentioned earlier. In some examples, termination can also result from activating a separate input of the device 100, such as a mechanical button on the housing 104, or the like. When the determination at block 235 is negative, the processor 120 returns to block 215 to repeat the above process. For example, FIG. 7 illustrates a further pose of the display 112 in relation to the simulated input object, as well as the portion of the input object rendered on the display 112. The region 600 is also shown as having been updated following detection of a selection of the "4" key at another performance of block 225.

Following an affirmative determination at block 235, the processor 120 proceeds to block 240. At block 240, the input sequence is returned, e.g. to the application that generated the input mode command from block 205. The input sequence can then be discarded, and the coordinate system 300 may also be discarded.

As will be apparent from the discussion above, performance of the method 200 enables an input mode that can enhance visibility and selectability of selectable input elements, particularly for devices with small displays. The above functionality may therefore reduce the likelihood of errors in input data collected by the device 100.

Further variations to the above input mechanisms are contemplated. For example, referring to FIG. 7, the scale of the simulated input object can be modified, e.g. by way of a pinch gesture on the touch screen or other suitable input from the operator of the device 100. As a result, the processor 120 can scale a current instance of the simulated input object definition up or down. In FIG. 7, the input object has been reduced in size, with the result that a greater portion of the input object is visible on the display 112 than is shown in FIG. 6. In some examples, such scaling is discarded upon completion of the performance of the method 200. In other examples, the definition 400 is updated persistently based on scaling commands, such that a subsequent initiation of the method 200 uses the same scale as a previous performance.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A wearable computing device, comprising:
   a display, the display being planar;
   a motion sensor;
   a controller configured to:
      define, in a local coordinate system, a pose of a simulated input object having a plurality of selectable input elements by determining a transformation between the local coordinate system and a coordinate system of the pose of the simulated input object;
      using the motion sensor, determine a sequence of current poses of the display in the local coordinate system, and for each current pose in the sequence:
         (i) based on the current pose and the pose of the simulated input object, select a portion of the simulated input object, including a subset of the selectable input elements, by determining a boundary of the display in the local coordinate system and overlaying the boundary of the display on the simulated input object in the local coordinate system, the boundary of the display being smaller than the simulated input object and the selected portion of the simulated input object being within the boundary of the display, and
         (ii) render the portion of the simulated input object on the display;
      for at least one of the sequence of current poses, detect a simulated key press associated with one of the subset of selectable input elements, and generate and render input data on the display corresponding to the one of the subset of selectable input elements, the input data including a string corresponding to a sequence of detected key presses;
   a housing containing the display, the motion sensor, and the controller; and
   a mounting component, coupled to the housing and configured to removably affix the housing to a forearm of an operator.

2. The wearable computing device of claim 1, wherein the controller is further configured to: receive an input mode command, and define the pose of the simulated input object in response to the input command.

3. The wearable computing device of claim 1, wherein the controller is configured, to define the pose of the simulated virtual input object, to:
   in response to determining an initial pose of the display, set the pose of the simulated virtual input object to place a predetermined one of the selectable input elements at the center of the display.

4. The wearable computing device of claim 1, wherein the controller is further configured to detect a termination command, and to provide the input data for processing in response to the input command.

5. The wearable computing device of claim 4, wherein the controller is further configured to discard the pose of the simulated input object in response to the termination command.

6. The wearable computing device of claim 1, wherein the controller is further configured, responsive to the detection of a simulated key press, to render an indication of the input data on the display.

7. The wearable computing device of claim 1, wherein the controller is further configured, to detect the simulated key press, to detect movement of the pose of the display in a direction perpendicular to a plane of the simulated input object.

8. The wearable computing device of claim 1, further comprising a touch screen; wherein the controller is further configured, to detect the simulated key press, to detect contact with the touch screen.

9. A method in a wearable computing device, the method comprising:
  defining, in a local coordinate system, a pose of a simulated input object having a plurality of selectable input elements by determining a transformation between the local coordinate system and a coordinate system of the pose of the simulated input object;
  using a motion sensor of the wearable computing device, determining a sequence of current poses of a display of the wearable computing device in the local coordinate system, the display being planar;
  for each current pose in the sequence:
    (i) based on the current pose and the pose of the simulated input object, selecting a portion of the simulated input object, including a subset of the selectable input elements, by determining a boundary of the display in the local coordinate system and overlaying the boundary of the display on the simulated input object in the local coordinate system, the boundary of the display being smaller than the simulated input object and the selected portion of the simulated input object being within the boundary of the display, and
    (ii) rendering the portion of the simulated input object on the display;
  for at least one of the sequence of current poses, detecting a simulated key press associated with one of the subset of selectable input elements; and
  generating and rendering input data on the display corresponding to the one of the subset of selectable input elements, the input data including a string corresponding to a sequence of detected key presses.

10. The method of claim 9, further comprising: receiving an input mode command, and defining the pose of the simulated input object in response to the input command.

11. The method of claim 9, wherein defining the pose of the simulated virtual input object includes:
  in response to determining an initial pose of the display, setting the pose of the simulated virtual input object to place a predetermined one of the selectable input elements at the center of the display.

12. The method of claim 9, further comprising: detecting a termination command, and providing the input data for processing in response to the input command.

13. The method of claim 12, further comprising: discarding the pose of the simulated input object in response to the termination command.

14. The method of claim 9, further comprising, responsive to the detection of a simulated key press, rendering an indication of the input data on the display.

15. The method of claim 9, wherein detecting the simulated key press includes detecting movement of the pose of the display in a direction perpendicular to a plane of the simulated input object.

16. The method of claim 9, wherein detecting the simulated key press includes detecting contact with a touch screen of the wearable computing device.

* * * * *